UNITED STATES PATENT OFFICE.

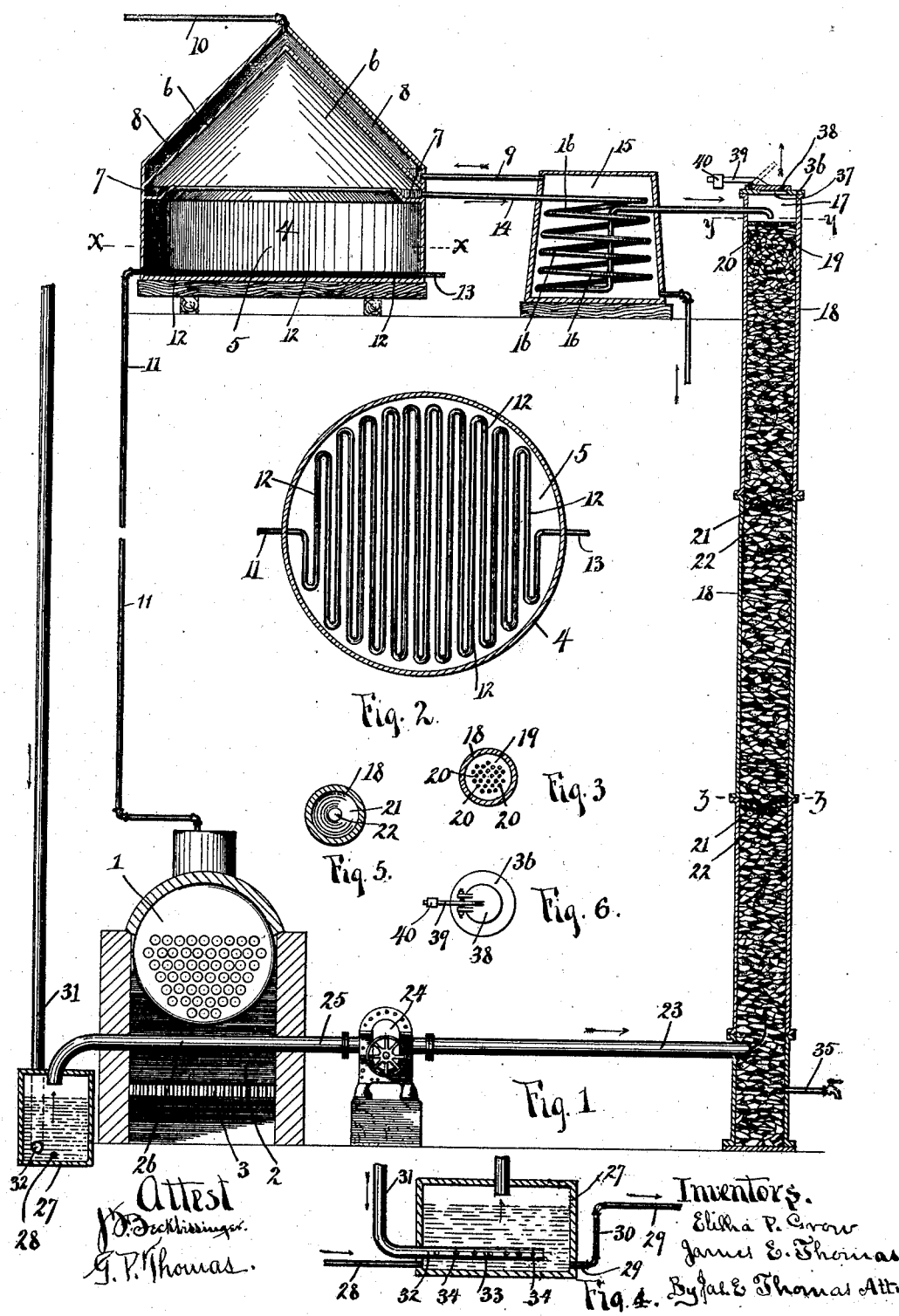

JAMES E. THOMAS AND ELISHA P. GROW, OF BAY CITY, MICHIGAN.

APPARATUS FOR AERATING DISTILLED WATER.

SPECIFICATION forming part of Letters Patent No. 502,408, dated August 1, 1893.

Application filed November 2, 1892. Serial No. 450,737. (No model.)

*To all whom it may concern:*

Be it known that we, JAMES E. THOMAS and ELISHA P. GROW, citizens of the United States, residing at Bay City, in the county of Bay and State of Michigan, have invented certain new and useful Improvements in Apparatus for Aerating Distilled Water, of which the following is a specification, reference being had therein to the accompanying drawings.

Our present invention relates to the aeration of distilled water, and the object of the invention is to provide a means whereby water having passed through the operation of distillation and mechanical purification may be supplied with the requisite or usual quantity of pure and refined atmosphere, whereby a fully aerated potable pure water is obtained which is free from all germs or putrefaction, growth, and disease, as well as free from condensed or dissolved deleterious gases.

The invention consists in the combination, arrangement and construction of the parts of the apparatus, together with their method of operation in relation to each other, as we will presently proceed to describe, and which will also be fully set forth and pointed out in the claims of this specification.

The invention is illustrated in the accompanying drawings in which—

Figure 1. is a transverse vertical section of our improved water distilling and aerating apparatus. Fig. 2. is a horizontal section of the still taken at $x$—$x$. Fig. 3. is a horizontal section of the aerator taken at $y$—$y$. Fig. 4. is a transverse vertical section of the air purifying portion of the apparatus. Fig. 5 is a horizontal section of the aerator taken at $z$—$z$, and Fig. 6. a top view of the aerator.

1, represents a steam boiler of any ordinary form and construction, and 2, is the furnace beneath the boiler, and 3, is the grate surface in the same. Located above the boiler at a considerable height is a still 4, consisting preferably of an evaporating chamber 5, above which is arranged a conical roof 6, forming a condensing surface, and at the base of this condensing surface is arranged a circular trough 7, while above the roof portion is arranged a chamber 8, into which cold water is forced through a pipe 9, connected with the base of the chamber which at the apex thereof is attached an out-flow pipe 10, so that a continuous flow of water is obtained to and from the chamber 8, for cooling the roof 6.

11, is a steam pipe leading from the boiler 1, to the base of the chamber 5, into which it is passed and is therein provided with a series of horizontal bends or coils 12, the opposite end 13, of the pipe passing out through the walls of the chamber and may be led to any convenient point.

14, is a pipe passed through the upper portion of the walls of the chamber 5, and is connected with the trough 7, and this pipe is then led into a cooling tank 15, into which it is provided with a series of coils 16, and is then led from the tank into the upper end portion of the aerator 17.

The aerator 17, consists of a vertical tube or cylinder 18, of considerable length, preferably for producing the best result about thirty or thirty-five feet, and within this cylinder is placed a filling of crushed stone or other similar disintegrated material of a similar nature, a clean and open ground absorbent sandstone being well adapted and preferable for the filling material.

Above the filling material and below the entrance of the pipe 14, to the aerator is arranged a disk 19, provided with a series of openings 20, in its central portion and at intervals below are placed disks 21, provided with central openings 22.

Near the base of the aerator is connected an air pipe 23, leading from the blast opening of a blower 24, of any convenient form, and from the exhaust opening of the blower a pipe 25, is led into, and has a portion 26, extended through the furnace 2, where it is subjected to heat from the fire, and the opposite end of this pipe is then led into or connected with the upper portion of a tank 27. This tank is constructed so as to be air tight, and is arranged to contain water to a certain desired level which would leave an air space above the water, the water being supplied by a pipe 28, leading from a pump or other convenient source, and the water is drawn from the tank by a pipe 29, which is attached to the tank considerably below the water level, and is provided with an upwardly extending section 30, which reaches to the desired water line and is then led away to any convenient exhaust point. Through the upper portion or cover of the tank an air supply pipe 31, is passed and the outer portion of this pipe is preferably led to or near to the top of the building for obtaining a comparatively pure supply of air, and the inner portion 32, of the supply pipe is led to near the bottom of the tank 27, and is then turned with a horizontal section 33, extending along the tank and provided along its upper or lateral sides with a series of perforations 34, while the extreme end of the section is closed.

Steam is raised in the boiler to the required pressure and is conducted through the pipe 11, and coils 12, through the lower portion of the evaporating chamber 5, which has previously been provided with a quantity of water sufficient to cover the coils, (the water being preferably formed from condensed steam from the boiler) and the heat from the steam within the coils 12, then evaporates the water in the chamber and the steam arising therefrom comes in contact with the cold roof 6, and is thereby condensed into pure water which trickling down the sloping roof is caught in the trough 7, the roof being kept cold by the cold water in the chamber 8, and from the trough 7, the condensed water is led through the pipe 14, to the coils 16, within the tank 15, where it is cooled and is then led through the remaining portion of the pipe to the aerator 17, where it drops from the pipe upon the center of the disk 19, and is thereby distributed through the series of openings 20, into the stone filling, through and around which it slowly passes downward, falling and flowing over the surface of the several pieces of crushed stone with an effect and result substantially the same as water percolates through soil and flows over pebbles in the bottom of a rivulet where it receives its usual and necessary supply of atmosphere, and thereby attains the desired flavor and brisk and pleasant taste. At the same time this operation of distilling and cooling the water is going on the blower 24, is supplied with the required motion from any convenient source, and a current of air is thereby drawn through the supply pipe section 31, into the section 33, from whence it passes through the perforations 34, into the water of the tank, which cleanses the air from all free ammonia, dust, particles by absorption, and the air then passes through the heated section 26, which has the effect of raising the temperature of the air with a dry heat which has the effect of consuming or killing all living germs, bacteria, &c., and then the air is conveyed through the blower and through the blast pipe 23, to the lower portion of the aerator where it passes upward through the interstices between the disintegrated filling, and comes in contact with the finely divided water trickling over, and oozing through the porous mass, whereby the required amount of air is dissolved and carried along with the water, which then flows from the aerator through the pipe 35, to any desired vessel for storing the same. Upon the upper end of the aerator a cover 36, is fitted to close the end, and this cover is provided with an opening 37, over which is fitted a hinged valve 38, and this valve is provided with an outwardly extending lever 39, upon which is placed a weight 40, for operating as a counterbalance for the valve, so that the upward current of air within the aerator cylinder can lift the valve and pass out, while the valve is capable of closing to shut off the entrance of air into the top of the aerator when the air current from below ceases from any cause.

Of course it will be understood that while we have illustrated and described a particular form and construction of distilling apparatus to illustrate the complete process of the purification of water, any other distilling devices may be used as this application pertains entirely to the devices for aerating the water, and for purifying the atmosphere to be used therefor. And while it is evident the aerator may be used without the blower and the air purifying attachments and produce a good aeration of the water passing through the same, it is also well known that the atmosphere in its usual state is charged with a considerable quantity of dissolved free ammonia, also with more or less germs and spores of disease and vegetable growth, and which when passed with the air to contact with distilled water are liable to be taken up and retained by the water and cause a vegetable or animal growth and putrefaction, and the removal of these obnoxious and deleterious ingredients is an important and essential feature of the invention. And it will be seen that by first passing the air to be used for aeration, through the water in the tank 27, the free ammonia contained therein is absorbed and retained by the water in the tank, together with the dust and floating particles carried thereby, and the air then passing through the heated section 26, comes in contact with the heated surface thereof and attains a high degree of temperature which effectually destroys all living disease germs and microbes so that when the air is passing into the aerator it is entirely free from all foreign matter which would be absorbed, and cause the water to become putrescent or impregnated with living animal or vegetable growth, and a pure and wholesome water is obtained, which can be bottled or stored free from contact with the atmosphere and kept for years in full purity and perfection. And while the water deposited by the pipe 14, into the middle of the aerator, may continue to move downwardly over the filling in the central portion, it is liable to be conducted outward to the sides of the chamber by the particles of stone, and of course when in contact with the side walls would follow the same directly to the bottom, therefore we interpose at suitable intervals, the disk 21, for deflecting the descending water from the outside portion of the filling to the center thereof, so that the downward flow of water is retarded and the finely divided particles of water are thus kept for a considerable period of time in contact with the atmosphere, so that plenty of time is allowed for the proper absorption or taking up of the necessary atmosphere, for perfecting the taste or flavor of the water.

It will be also noticed that by having the aerator of considerable length and filled with crushed sandstone or disintegrated or porous material of a like nature, the water is held in a finely divided state for a long time in close contact with the upwardly moving air current so that in passing through the length of the aerator, each particle or atom of water is placed in a position for proper exposure to receive its ordinary atmosphere, so that the distilled water, after passing through the disintegrated filling, passes from the aerator fully supplied with a pure and uncontaminated atmosphere which imparts to the water a brisk and lively appearance, and also supplies a sweet and exceedingly delicious flavor to the same.

Of course it will be understood that while we have illustrated the air supply pipe arranged for being heated to a high temperature by the fire beneath the boiler, any other means for heating the air could be used as well, as the especial aim and object of heating the air are to render extinct all living disease germs and other spores which are commonly contained in ordinary atmosphere, so that purified air, only, will be dissolved by the distilled water.

Having described our invention, what we claim as new, and desire to secure by Letters Patent, is—

1. The combination of the water still, with a hollow vertical cylinder provided with a filling of crushed or disintegrated stone, a pipe leading from the still to the upper portion of said cylinder, an air pipe passing through a furnace for heating the contained air and leading to the bottom of the cylinder, substantially as set forth.

2. The combination of the water still, with a hollow vertical cylinder as described, and provided with a filling of crushed or disintegrated stone, and a pipe for conducting the water from the still to the upper end of said cylinder, an air pipe connected to the lower end of the cylinder, a blower for supplying air currents to said pipe, and a furnace for heating a portion of the pipe to purify the air passing through the same substantially as set forth.

3. The combination of the water still, the aerator, a pipe for conducting the water from the still to the aerator, a pipe passing through a heater for conducting purified air to the aerator, a blower for supplying air currents to the pipe, a closed tank for containing water in its lower portion, and having the said air pipe connected with its upper portion and an air supply pipe having its inner end passed into the tank and extended below the water surface thereof, substantially as set forth.

4. The combination of the water still, the long vertical aerator cylinder having a filling of disintegrated or crushed stone, and a pipe for conducting water from the still to the aerator, an air pipe provided with a blower for conducting air to the aerator, and a series of disks depressed toward their center and placed at intervals within the aerator cylinder, and provided with a central opening for deflecting the descending water and the ascending air current from the outer portions of the filling material to the central portion thereof, substantially as described.

In testimony whereof we affix our signatures in presence of two witnesses.

JAMES E. THOMAS.
ELISHA P. GROW.

Witnesses:
GEO. P. THOMAS,
T. FLUES.